Patented Apr. 26, 1949

2,468,530

UNITED STATES PATENT OFFICE 2,468,530

AFTERTREATMENT OF VISCOSE RAYON

Johannes G. Weeldenburg, Velp, Netherlands, assignor to American Enka Corporation, Enka, N. C., a corporation of Delaware No Drawing. Application April 1, 1946, Serial No. 658,743. In Germany August 14, 1944

9 Claims. (Cl. 8—116.4)

The present invention relates to the aftertreatment of viscose rayon and more particularly to a method of improving the physico-chemical properties of viscose threads and the like by treating them with compounds that are capable of forming linear polymers.

In my co-pending applications Serial Nos. 661,516, filed April 12, 1946 (now Patent No. 2,458,886), and 661,517, filed April 12, 1946, (Patent No. 2,468,531), there are described and claimed the use of certain aromatic alcohols and their salts for bonding together cellulosic materials and rubber and for improving the properties of casein products.

It is known to impregnate rayon with many types of compounds that form resins, for various and sundry purposes. These resins, however, are simply deposited in the base material and do not react with the constituents of the material. This is evidenced by the fact that such resins may be dissolved out of the material by their usual solvents, e. g., alcohol, or a mixture of alcohol and benzene. The general type of resins employed in the past are those derived from condensation products of phenol, urea and the like with formaldehyde and it is assumed that in the condensation of the molecules, three-dimensional nets are formed. However, in these types of resins the polymerization process proceeds so rapidly that a compound formation with the base material, such as cellulose, cannot take place and therefore as stated above the resins do not react with the cellulose.

In contradistinction to the above described impregnation process, the present invention contemplates the use of substances that do not polymerize as rapidly as the three-dimensional type and accordingly have the opportunity to react with cellulose.

It is a further object of this invention to treat viscose products with compounds that upon heating show a tendency to polymerize but in so doing form only linear polymers as distinguished from three-dimensional polymers.

Another object of the invention is to improve the properties of viscose rayon by immersing the yarn or fabric in solutions of compounds that form linear polymers such as a dialcohol of monosubstituted phenol where the substituent is in an ortho or para position, or a mono-alcohol of double substituted phenol where the substituents are in the ortho positions or in one ortho and one para position, or the salts of the said alcohols.

Other objects and advantages of the present invention will become apparent from the following description which illustrates the types of compounds here involved.

It is well known that the phenol molecule ($C_6H_5OH$) can react with formaldehyde ($H_2CO$) to form a condensation product known as a phenol resin (Bakelite). When this reaction occurs, the three reactive hydrogen atoms of the phenol, i. e., those in positions 2, 4, and 6, react with formaldehyde. The positions 2 and 6 are termed ortho positions and the position 4 is termed para position. Such a condensation product is assumed to form three-dimensional nets.

It is possible in the phenol molecule to substitute for one of the reactive hydrogen atoms, an organic radical such as the methyl group ($CH_3$) which forms a cresol, for example, paracresol. Of course, it is to be understood that the invention is not to be limited to the methyl group as other substituents acting in the same manner may be substituted for one of the reactive hydrogen atoms. For example, one of the reactive hydrogen atoms may be substituted by an inorganic negative atom such as a chlorine atom which would form a chlorophenol, for example ortho-chlorophenol.

Para-cresol-dialcohol is formed by the reaction of two molecules of formaldehyde with one molecule of para-cresol. The preparation of these compounds has been described by Ullmann and Brittner (German Chemical Society 1909, page 2540). As described in the said reports, the sodium salt of para-cresol-dialcohol was prepared and separated out as a white substance by mixing one mol. of para-cresol with two mols. of formaldehyde and one mol. of sodium hydroxide leaving the mixture standing at room temperature for a few days. By the addition to a solution of the white substance of an acid such as acetic acid, free para-cresol-dialcohol can be obtained as a white crystallized mass, which, after recrystallization from ethylacetate, had a melting point of 130° C.

The formation of the para-cresol-dialcohol in the manner mentioned in the preceding paragraph may be represented as follows:

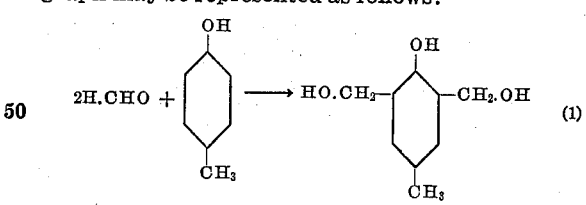

(1)

When two of the reactive hydrogen atoms are substituted in the phenol molecule, the molecule can react with only one molecule of formaldehyde thereby forming a mono-alcohol of double substituted phenol.

For example, the synthesis of 2.4-dimethyl-phenol-6-mono-alcohol may be represented by the following equation:

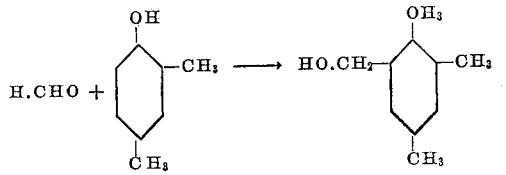

The dialcohols and monoalcohols referred to in the preceding description may also be designated chemically as dimethylol- and monomethylol-derivatives of a substituted phenol, and from this point on they will be so designated. According to this nomenclature the reaction product shown in Equation (1) is 2.6-dimethylol-4-methyl-phenol and the reaction product shown in Equation (2) is 2.4-dimethyl-6-methylol-phenol.

It will be understood that the preformed monomeric di-methylol- and mono-methylol-derivatives of substituted phenols, and their salts, are employed in the practice of the present invention.

In the above description, the meta or 3 and 5 positions in the phenol or substituted phenol have not been discussed, as these positions are innocuous in the sense of the present invention, but may be satisfied by hydrogen atoms although any neutral group may be substituted just as well.

These di- and mono-methylol derivatives of substituted phenol or their linear polymers have been found to react with cellulose, and in particular, with regenerated or hydrated cellulose which constitutes the base of viscose filaments. Apparently bridges are formed between the cellulose molecules during the reaction which improve the properties of the rayon. The strength of viscose rayon is increased and at the same time its filaments thereof are caused to become strongly hydrophobic, i. e., they repel water better than untreated yarn, their swelling value decreases, an increase in wet strength is effected and, in addition, the fabrics show an increased resistance to wear in the wet condition.

In support of the theory that the improved results are attributable to the formation of molecule bridges as distinguished from simple deposit of three-dimensional condensation products (for instance, of formaldehyde and phenol) in the cellulose, it has been determined that the improved fibers are not altered by treatment with alcohol or a mixture of alcohol and benzene. If the materials merely formed a deposit without any compound formation, they would be extracted by the said liquids. Furthermore, the improved properties of the yarn are not changed by washing with a hot 1% solution of soap to which soda has been added, and accordingly, the products made from the yarn will withstand cleaning during use, which is a distinct advantage.

The formation of chemical compounds is also proved by the fact that the mono-methylol derivatives of para-cresol has less influence on the properties of the cellulose than the corresponding dimethylol derivative. In addition, the formation of chemical compounds is proved by the fact that 2-methyl-4.6-dimethylol-phenol, in which one alcohol group occupies the ortho position and the other alcohol group occupies the para position, influences the properties of the cellulose to a lesser extent than the dimethylol derivative in which both groups occupy the ortho position. This is due to the fact that the alcohol group in the para position is always less reactive than in the ortho position.

It is not essential that the dimethylol derivative be used in the pure state. Moreover, the cresol can be dissolved in a mixture of formaldehyde and sodium hydroxide solution. This mixture being allowed to stand for a sufficient period, is diluted until the desired concentration has been obtained and the final solution of the sodium salt of the dimethylol derivative can then be used as the bath in which rayon, staple fiber, or the products made therefrom, are immersed. Another alternative is to add an acid such as acetic acid to first liberate the dimethylol derivative before the materials are immersed, but in which case, it is necessary to heat the liquid to 70°–100° C., or otherwise the dimethylol derivative will crystallize out.

*Example 1*

20 grams of para-cresol were dissolved in 45 grams of a 20% solution of sodium hydroxide, to which 36 c. c. of a 35% formaldehyde solution were added and the mixture was allowed to stand for three days at room temperature. Thereupon water was added to make one liter which caused the separated sodium salt to dissolve, and acetic acid was used to neutralize the solution with the aid of litmus. The thus obtained liquor was heated to 70° C. to prevent the 2.6-dimethylol-4-methyl-phenol from crystallizing out. A skein of viscose rayon was immersed in this solution for 15 minutes, centrifuged, dried normally, and finally heated to 130° C. for two hours. During the heating operation, the rayon did not change in color. The swelling value, as compared with the original rayon, was found to be reduced from 95% to 48%. (This value was determined according to the "Testing Method of the Trade Association for the Chemical Preparation of Filaments.")

The change in the mechanical properties of the yarn thus treated is given in the following table:

|  | Denier | Strength in grams per 100 denier | | Elongation in percent | |
|---|---|---|---|---|---|
|  |  | Dry | Wet | Dry | Wet |
| Treated | 98 | 217 | 126 | 12.5 | 13 |
| Untreated | 96.5 | 197 | 95 | 16 | 18 |

It will be seen from the above table that the denier had increased only slightly, while the dry strength had increased by 10%, the wet strength by about 30%, and the elongation had decreased by about 25%.

The resistance to wear in the wet state amounted to 75% for the untreated rayon and amounted to 125% for the treated rayon. These figures were determined as follows: It was determined how much weight was required to break a thread in 60 seconds, which thread was in frictional engagement with a rotating roller.

The reduced swelling value and the improved mechanical properties of the treated rayon remained unaltered after both a treatment with alcohol and after washing with a hot 1% soap solution.

Example 2

Skeins of viscose rayon were immersed for 15 minutes in:

(a) A 1% solution of 2.6-dimethylol-4-methyl-phenol
(b) A 1% solution of ortho-cresol-dialcohol
(c) A 2.5% solution of para-methyl-ortho-methylol-phenol The skeins thus treated were then centrifuged, dried, and heated for two hours at 130° C. The swelling values, as compared with the original rayon were:

| | Per cent | | Per cent |
|---|---|---|---|
| Untreated | 90 | (b) | 67 |
| (a) | 61 | (c) | 64 |

Example 3

A rayon fabric was treated with a 2.5% solution of 2.6-dimethylol-4-methyl-phenol and after centrifuging and drying, heated for two hours at 130° C. A piece of about one cm$^2$ of this fabric remained floating on the water for several days. A piece of the untreated fabric sank under the same conditions within a few minutes. This different behavior is a direct test of the water repellency of the treated fabric.

Example 4

20 grams of para-cresol were dissolved in 45 grams of a 20% sodium hydroxide solution and 36 c.c. of a 35% formaldehyde solution were added and the mixture was allowed to stand at room temperature for three days. Water was then added to make up to 1 liter, which effected the dissolving of the separated sodium salt of 2.6-dimethylol-4-methyl-phenol. A skein of viscose rayon was immersed in this solution for 15 minutes, centrifuged, dried normally and then heated to 130° C. for two hours. It was determined that the swelling value was reduced from 95% to 48% while the mechanical properties of the rayon were determined to be as follows:

| | Denier | Strength in grams per 100 denier | | Elongation in percent | |
|---|---|---|---|---|---|
| | | Dry | Wet | Dry | Wet |
| Treated | 99 | 218 | 129 | 12.8 | 16.2 |
| Untreated | 95 | 206 | 98 | 14.8 | 20.9 |

Example 5

A solution of the sodium salt of 2.6-dimethylol-4-chlorophenyl was prepared by mixing 1 mol. of para-chlorophenol, 1 mol. of sodium hydroxide, and 2 mols. of formaldehyde. Viscose rayon was immersed in this solution, centrifuged, and then finally dried for two hours, in one test at 130° C. and in a second test at 150° C. The results were as follows:

| | Swelling value | Strength in grams per 100 denier | | Elongation in percent | |
|---|---|---|---|---|---|
| | | Dry | Wet | Dry | Wet |
| | Per cent | | | | |
| Untreated | 91 | 200 | 96 | 16 | 17 |
| First test (130° C.) | 71 | 197 | 101 | 15 | 18 |
| Second test (150° C.) | 55 | 198 | 112 | 15 | 17 |

A number of experiments, similar to those above described for viscose rayon, were conducted on cotton. The results showed that the swelling value of cotton was decreased, but the mechanical properties were not improved, and as a matter of fact, were not as good as those for untreated cotton. It certainly could not have been foreseen that these dimethylol and mono-methylol derivatives or their salts react with regenerated cellulose to thereby improve the physico-chemical properties thereof.

What is claimed is:

1. A method of reducing the swelling value and increasing the water repellancy and wet strength of viscose rayon and products formed therefrom which comprises the steps of reacting the rayon with an aqueous solution consisting essentially of a preformed monomeric compound of the class consisting of the dimethylol and the mono-methylol derivatives of mono- and di-substituted phenols, respectively, and their salts, formed from the reaction of formaldehyde and a substituted phenol in which at least one, but not more than two, of the three reactive hydrogen atoms in the para position and ortho positions has been substituted by a substituent selected from the class consisting of —CH$_3$ and —Cl, removing excess solution, and drying and heating to fix said compound upon the treated rayon.

2. A method as defined in claim 1 which includes the steps of centrifuging the treated rayon, drying and heating the rayon for a few hours at a temperature in the neighborhood of 130° C.

3. A method of reducing the swelling value and increasing the water repellancy and wet strength of viscose rayon which comprises the steps of reacting the rayon with an aqueous solution consisting essentially of a preformed monomeric mono-substituted dimethylol phenol, where the substituent is selected from the class consisting of —CH$_3$ and —Cl and is in one of the otho positions, removing excess solution, and drying and heating to fix said compound upon the treated rayon.

4. A method of reducing the swelling value and increasing the water repellancy and wet strength of viscose rayon which comprises the steps of reacting the rayon with an aqueous solution consisting essentially of a preformed monomeric mono-substituted dimethylol phenol, where the substituent is selected from the class consisting of —CH$_3$ and —Cl and is the para position, removing excess solution, and drying and heating to fix said compound upon the treated rayon.

5. A method of reducing the swelling value and increasing the water repellancy and wet strength of viscose rayon which comprises the steps of reacting the rayon with an aqueous solution consisting essentially of preformed monomeric 2.6 - dimethylol - 4 - methyl - phenol, removing excess solution, and drying and heating to fix said compound upon the treated rayon.

6. A method of reducing the swelling value and increasing the water repellancy and wet strength of viscose rayon which comprises the steps of reacting the rayon with an aqueous solution consisting essentially of preformed monomeric 2-methyl-4.6-dimethylol-phenol, removing excess solution, and drying and heating to fix said compound upon the treated rayon.

7. A method of reducing the swelling value and increasing the water repellancy and wet strength of viscose rayon which comprises the steps of reacting the rayon with an aqueous solution consisting essentially of a salt of a preformed monomeric mono-substituted dimethylol phenol where the substituent is selected from the class consisting of —CH$_3$ and —Cl and is in the para position, removing excess solution, and drying and heating to fix said compound upon the treated rayon.

8. A method of reducing the swelling value and increasing the water repellancy and wet strength of viscose rayon which comprises the steps of reacting the rayon with an aqueous solution consisting essentially of the sodium salt of preformed monomeric 2.6-dimethylol-4-methyl phenol, removing excess solution, and drying and heating to fix said compound upon the treated rayon.

9. A method of reducing the swelling value and increasing the water repellancy and wet strength of viscose rayon which comprises reacting the rayon with a 1%–2.5% aqueous solution consisting essentially of preformed monomeric 2.6-dimethylol-4-methyl-phenol for about fifteen minutes, removing the excess liquid by centrifuging, drying and finally heating the rayon for about two hours at a temperature in the neighborhood of 130° C.

JOHANNES G. WEELDENBURG.

REFERENCES CITED

The following references are of record in the file of this patent:

UNITED STATES PATENTS

| Number | Name | Date |
|---|---|---|
| 1,734,516 | Foulds et al. | Nov. 5, 1929 |
| 2,054,444 | Pinten | Sept. 15, 1936 |
| 2,088,227 | Battye et al. | July 27, 1937 |
| 2,158,494 | Corteen et al. | May 16, 1939 |
| 2,190,672 | Meharg | Feb. 20, 1940 |
| 2,288,695 | Fuller | July 7, 1942 |

FOREIGN PATENTS

| Number | Country | Date |
|---|---|---|
| 463,472 | Great Britain | Mar. 22, 1937 |
| 480,171 | Great Britain | Feb. 15, 1938 |
| 484,691 | Great Britain | Aug. 4, 1936 |
| 524,511 | Great Britain | Aug. 8, 1940 |

OTHER REFERENCES

Granger—"Condensation of Phenols with Formaldehyde," I. and E. Chem. vol. 24, No. 4. (April 1932), pages 442–447. Copy in 260—57.